United States Patent
Okada et al.

(10) Patent No.: US 9,386,175 B2
(45) Date of Patent: Jul. 5, 2016

(54) IMAGE FORMING APPARATUS AND COMPUTER-READABLE RECORDING MEDIUM WITH GROUP DISPLAY INSTRUCTION AREA

(71) Applicant: Konica Minolta, Inc., Chiyoda-ku (JP)

(72) Inventors: Takuya Okada, Toyokawa (JP); Yoichi Kurumasa, Toyokawa (JP); Masao Hosono, Toyokawa (JP); Kenichi Komaba, Toyokawa (JP); Kazuhiro Tomiyasu, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 167 days.

(21) Appl. No.: 14/018,747

(22) Filed: Sep. 5, 2013

(65) Prior Publication Data
US 2014/0078535 A1    Mar. 20, 2014

(30) Foreign Application Priority Data

Sep. 18, 2012    (JP) .................................. 2012-204562

(51) Int. Cl.
*G06F 3/12*    (2006.01)
*H04N 1/00*    (2006.01)
(Continued)

(52) U.S. Cl.
CPC .......... *H04N 1/00413* (2013.01); *G06F 3/0482* (2013.01); *G06F 3/0485* (2013.01);
(Continued)

(58) Field of Classification Search
CPC .......... H04N 1/00413; H04N 1/00411; H04N 1/00482; H04N 1/00511; H04N 1/00474; H04N 1/00466; H04N 1/00384; G06F 3/0485; G06F 3/0482; G06F 2203/04805
USPC .................................................. 358/1.13, 1.1
See application file for complete search history.

(56) References Cited

U.S. PATENT DOCUMENTS

| | | | |
|---|---|---|---|
| 2006/0007469 | A1 | 1/2006 | Uruma |
| 2011/0231800 | A1 | 9/2011 | Tomita et al. |
| 2012/0026534 | A1 | 2/2012 | Uruma |
| 2012/0069377 | A1 * | 3/2012 | Narimatu et al. ............ 358/1.13 |

FOREIGN PATENT DOCUMENTS

| | | | |
|---|---|---|---|
| CN | 1719433 | A | 1/2006 |
| JP | 09-305063 | A | 11/1997 |

(Continued)

OTHER PUBLICATIONS

Office Action issued on Sep. 24, 2014, by the Japanese Patent Office in corresponding Japanese Patent Application No. 2012-204562, and an English Translation of the Office Action.

(Continued)

*Primary Examiner* — Martin Mushambo
(74) *Attorney, Agent, or Firm* — Buchanan Ingersoll & Rooney PC

(57) ABSTRACT

An image forming apparatus includes a switching operation unit switching a display mode of a setting screen between first and second display modes. A first display screen in a first display mode includes an icon display area displaying icons arranged in a predetermined direction and corresponding to function buttons for setting each function, and a first function button display area displaying some of the function buttons corresponding to some of the icons specified by a range specification unit. The function buttons are classified into groups according to their function attribute. A second display screen in the second display mode includes a group display instruction area provided with group specification buttons for receiving input of a group display instruction to display function buttons belonging to a specific group among the groups, and a second function button display area displaying the function buttons belonging to the specific group among the function buttons.

17 Claims, 14 Drawing Sheets

(51) Int. Cl.
*G06F 3/0482* (2013.01)
*G06F 3/0485* (2013.01)

(52) U.S. Cl.
CPC ....... *H04N1/00384* (2013.01); *H04N 1/00411* (2013.01); *H04N 1/00466* (2013.01); *H04N 1/00474* (2013.01); *H04N 1/00482* (2013.01); *H04N 1/00511* (2013.01); *G06F 2203/04805* (2013.01)

(56) References Cited

FOREIGN PATENT DOCUMENTS

| | | |
|---|---|---|
| JP | 2002-290660 A | 10/2002 |
| JP | 2003-229978 A | 8/2003 |
| JP | 2006-21501 A | 1/2006 |
| JP | 2007-140589 A | 6/2007 |
| JP | 2011-193405 A | 9/2011 |
| JP | 2011-259393 A | 12/2011 |
| JP | 2012-68700 A | 4/2012 |
| JP | 2012-083893 A | 4/2012 |
| JP | 2012-173888 A | 9/2012 |

OTHER PUBLICATIONS

First Office Action issued on Aug. 27, 2015, by the Chinese Patent Office in corresponding Chinese Patent Application No. 201310428649.9 and an English Translation of the Office Action (31 pages).

* cited by examiner

Fig.3

| GROUP | FUNCTIONS |
|---|---|
| "BASIC SETTING" GROUP GP1 | "COLOR", "DENSITY", "IMAGE QUALITY OF ORIGINAL DOCUMENT", "PAPER", "ZOOM" |
| "ORIGINAL DOCUMENT" GROUP GP2 | "ORIGINAL DOCUMENT SETTING", "BOOK COPY", "CONTINUOUS READING", "AUTOMATIC IMAGE ROTATION" |
| "LAYOUT" GROUP GP3 | "BOOKLET", "BINDING EDGE", "IMAGE SHIFT", "MIRROR IMAGE", "REPEAT", "TILING" |
| "APPLICATION" GROUP GP4 | "OHP INTERLEAVE", "COVER INSERT", "SHEET INSERT", "CHAPTER INSERT" |
| "IMAGE QUALITY/DENSITY" GROUP GP5 | "BACKGROUND ADJUSTMENT", "CHARACTER CONTRAST", "GLOSSY COPY" |

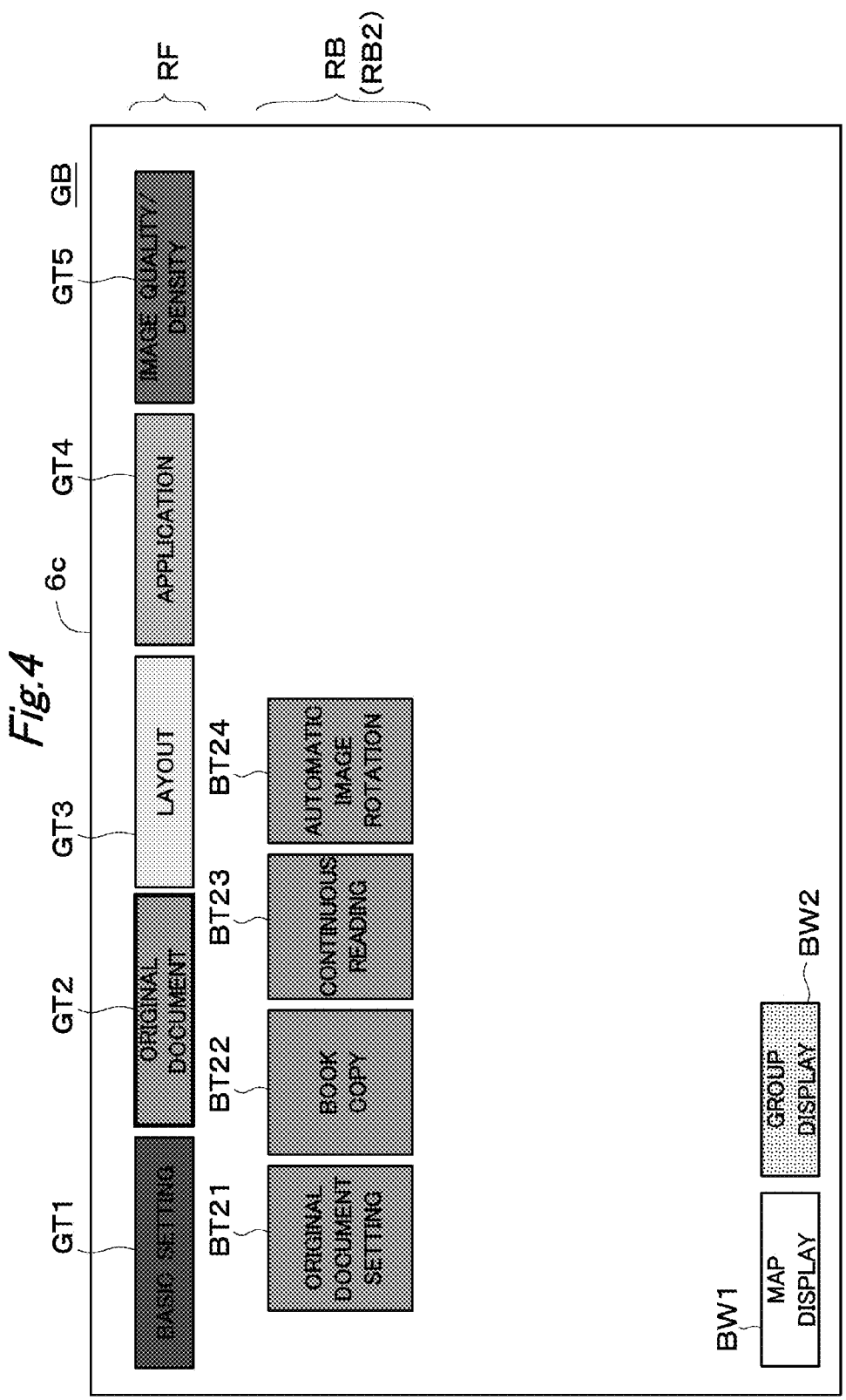

| DISPLAY MODE | NUMBER OF TIMES OF SWITCHING |
|---|---|
| MAP DISPLAY MODE | 183 |
| GROUP DISPLAY MODE | 201 |

IMAGE FORMING APPARATUS AND COMPUTER-READABLE RECORDING MEDIUM WITH GROUP DISPLAY INSTRUCTION AREA

This application is based on Japanese Patent Application No. 2012-204562 filed on Sep. 18, 2012, the contents of which are hereby incorporated by reference.

BACKGROUND OF THE INVENTION

1. Technical Field

The present invention relates to an image forming apparatus and a technique related thereto.

2. Related Art

As image forming apparatuses take on more and more functions year after year, the number of buttons (function buttons) for setting the functions of an image forming apparatus is also increasing. For this reason, it is difficult to display all function buttons corresponding to all functions on the operation panel unit (display unit) of an image forming apparatus.

Meanwhile, there is a technique for classifying a large number of function buttons into a plurality of function groups and switching among and displaying a plurality of tab screens (tab screens for the respective function groups), each including function buttons belonging to each function group (see, for example, Japanese Patent Application Laid-Open No. 2002-290660). With such a tab screen switching technique, however, a plurality of function buttons that span different function groups are presented in different tab screens, and thus it is difficult to get an overview of all of a large number of function buttons.

To address the problem, Japanese Patent Application Laid-Open No. 2011-193405, for example, discloses a technique in which, among a plurality of function buttons arranged in a predetermined direction, some function buttons specified by the user are displayed in a function button display area on the display unit. The function buttons displayed in the function button display area can be changed by a scroll operation by the user.

To be more specific, with the technique disclosed in Japanese Patent Application Laid-Open No. 2011-193405, a setting screen that includes an icon display area and a function button display area is displayed on the display unit of the image forming apparatus.

In the icon display area, a plurality of icons corresponding to a plurality of function buttons for setting each function are horizontally arranged and displayed. The icons are displayed classified into a plurality of function groups (specifically, collected in the function groups). The icon display area is provided with a slider for selecting some icons in the icon display area. Some of the icons displayed in the icon display area are specified through a user operation using the slider. To be specific, the slider includes a frame body (range specification frame) of a predetermined width that moves along with the movement of the slider, and icons that are enclosed with the range specification frame after the movement of the slider are regarded as the specified icons.

The function button display area, on the other hand, displays some function buttons that correspond to the icons specified by the user operation among a plurality of function buttons.

With the technique disclosed in Japanese Patent Application Laid-Open No. 2011-193405, the user can easily find a desired function button while getting an overview of a large number of function buttons.

However, the user is required to perform an operation to move the slider closer to the desired function (or the desired function group) even when already having decided which function (function group) to set. Thus, the operation of specifying the target display area, which involves the movement of the slider, may be troublesome for a user who has already decided which function to set. It is thus desired to make the operation of setting a function simpler.

SUMMARY OF THE INVENTION

It is an object of the present invention to provide a technique that can improve user's operability of the setting screens of an image forming apparatus.

According to a first aspect of the present invention, an image forming apparatus includes a display control unit configured to display a setting screen on a display unit, and a switching operation unit configured to switch a display mode of the setting screen between a first display mode and a second display mode. A first display screen displayed in the first display mode includes an icon display area and a first function button display area, the icon display area displaying a plurality of icons that are arranged in a predetermined direction and correspond to a plurality of function buttons for setting each function, and the first function button display area displaying, among the plurality of function buttons, some function buttons that correspond to some icons specified by a range specification unit from among the plurality of icons. The plurality of function buttons are classified into a plurality of groups according to their function attribute. A second display screen displayed in the second display mode includes a group display instruction area and a second function button display area, the group display instruction area being provided with a plurality of group specification buttons for receiving input of a group display instruction to display function buttons that belong to a specific group among the plurality of groups, and the second function button display area displaying the function buttons belonging to the specific group among the plurality of function buttons.

According to a second aspect of the present invention, a non-transitory computer-readable recording medium records a program for causing a computer to execute the steps of a) displaying a first display screen on a display unit, the first display screen including an icon display area and a first function button display area, the icon display area displaying a plurality of icons that are arranged in a predetermined direction and correspond to a plurality of function buttons for setting each function, and the first function button display area displaying, among the plurality of function buttons, some function buttons that correspond to some icons specified by a range specification unit among the plurality of icons, b) displaying a second display screen on the display unit, the second display screen including a group display instruction area and a second function button display area, the group display instruction area being provided with a plurality of group specification buttons for receiving input of a group display instruction to display function buttons that belong to a specific group among a plurality of groups into which the plurality of function buttons are classified, and the second function button display area displaying the function buttons belonging to the specific group among the plurality of function buttons, c) receiving a switching instruction to cause a switching operation unit to switch between the first display screen and the second display screen, and d) performing a switching operation to switch to the first display screen or a switching operation to switch to the second display screen in accordance with the switching instruction.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates classification of a plurality of functions.

FIG. 4 shows a display screen in a group display mode.

FIG. 14 shows a data table in which the number of times a switching operation is performed is stored.

DETAILED DESCRIPTION OF THE PREFERRED EMBODIMENTS

Hereinafter, an embodiment of the present invention will be described with reference to the drawings.

1. Configuration

Figure 1:
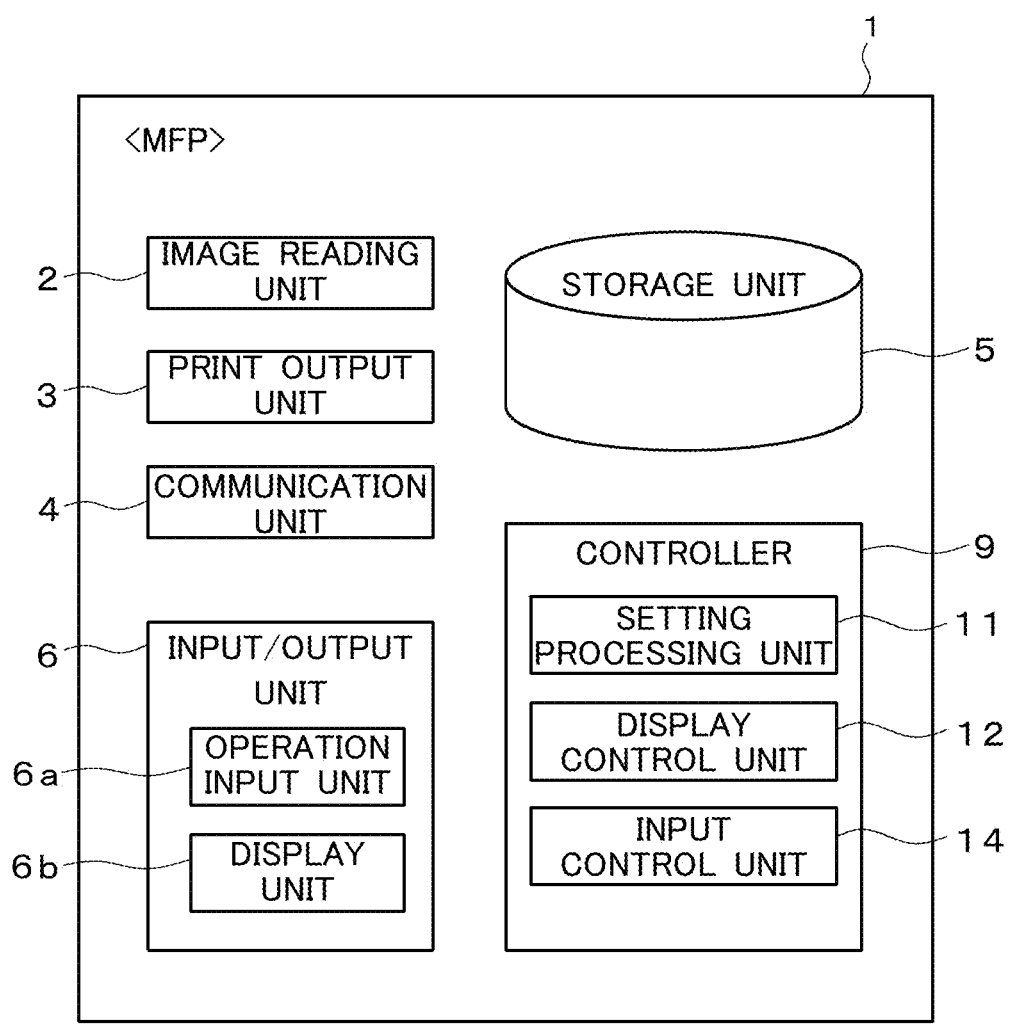
FIG. 1 is a functional block diagram showing a configuration of an image forming apparatus.

FIG. 1 is a functional block diagram showing a configuration of an image forming apparatus 1. In the present embodiment, the image forming apparatus 1 is configured as a Multi-Functional Peripheral (also referred to simply as an "MFP"). The MFP is an apparatus (also referred to as a "Multi-Functional Peripheral") having functions such as a scan function, a print function, a copy function, and a facsimile function.

As illustrated in FIG. 1, the image forming apparatus 1 includes, for example, an image reading unit 2, a print output unit 3, a communication unit 4, a storage unit 5, an input/output unit 6, and a controller 9, and implements various functions by operating these units in combination.

The image reading unit 2 is a processing unit configured to optically read an original document placed at a predetermined position on the image forming apparatus 1 and generate image data for the original document (also referred to as an "original image").

The print output unit 3 is an output unit configured to print out an image on various types of media such as paper on the basis of image data for an image to be printed.

The communication unit 4 is a processing unit capable of facsimile communication via a public network or the like. The communication unit 4 is also capable of network communication via a network. In the network communication, various types of protocols such as the Transmission Control Protocol/Internet Protocol (TCP/IP) and the File Transfer Protocol (FTP) are used. Using the network communication allows the image forming apparatus 1 to exchange various types of data with a desired party.

The storage unit 5 is configured by a storage device such as a hard disk drive (HDD) or a nonvolatile memory.

The input/output unit 6 includes an operation input unit 6a configured to receive input to the image forming apparatus 1, and a display unit 6b configured to display and output various types of information. Specifically, the image forming apparatus 1 is provided with an operation panel unit 6p (not shown) that functions as the input/output unit 6. The operation panel unit 6p includes various types of hardware keys and a touch screen 6c (see FIG. 2).

The touch screen 6c is configured by embedding piezoelectric sensors or the like in a liquid crystal display panel and functions not only as part of the display unit 6b but also as part of the operation input unit 6a. To be specific, the touch screen 6c is capable of displaying various types of information on the liquid crystal display panel and is also capable of detecting the position of an operator's finger on the liquid crystal display panel and receiving various types of input. For example, an operation of the operator touching a (virtual) button displayed on the touch screen 6c with his/her finger is regarded as pressing of the button.

As described above, the input/output unit 6 is capable of receiving input operations by the operator.

The controller 9 is a control unit configured to perform overall control of the image forming apparatus 1, and includes, for example, a CPU and various types of semiconductor memories (e.g., a RAM and a ROM). The various functions of the image forming apparatus 1 are implemented by various types of processing units operating under the control of the controller 9. The controller 9 implements various types of processing units by the CPU executing a predetermined software program (hereinafter, also referred to simply as a "program") PG stored in the ROM (e.g., an EEPROM). Note that the program PG or the like may be acquired by being downloaded through the network or may be acquired via various types of portable recording media (or in other words, various types of non-transitory computer-readable recording media) such as a USB memory.

Specifically, the controller 9 implements various types of processing units including a setting processing unit 11, a display control unit 12, and an input control unit 14.

The setting processing unit 11 is a processing unit configured to set various types of functions in the image forming apparatus 1, using setting screens or the like displayed on the touch screen 6c.

The display control unit 12 is a processing unit configured to control display operations to display various types of screens on the touch screen 6c.

The input control unit 14 is a processing unit configured to receive input of instructions from the user. Specifically, the input control unit 14 receives input of instructions from the user via various types of operational elements (e.g., a slider SL, group specification buttons GT, function buttons BT) that are displayed on the touch screen 6c or the like.

2. Display Screen GA

Figure 2:
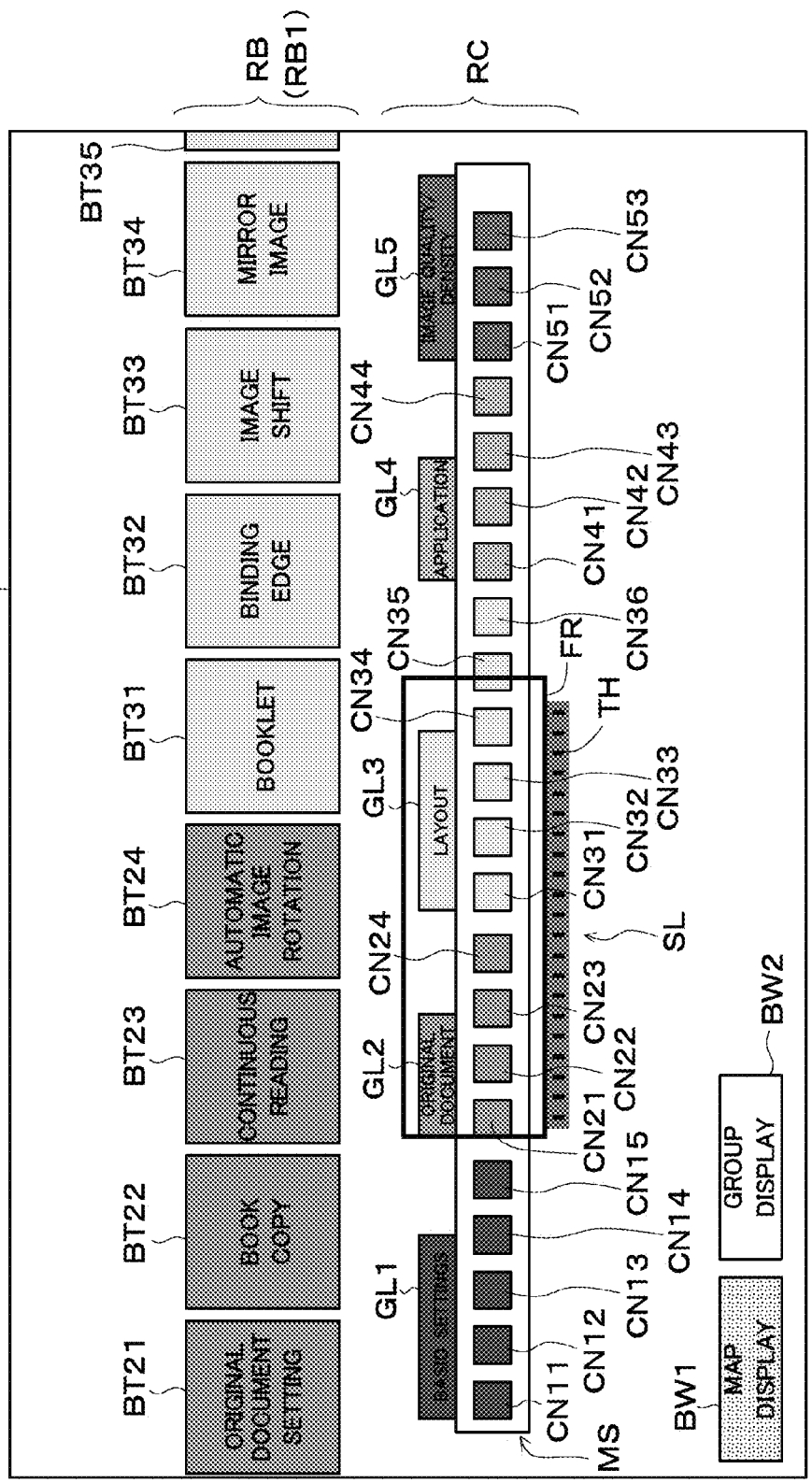
FIG. 2 shows a display screen in a map display mode.

FIG. 2 shows a setting screen (specifically, a menu screen for setting) displayed on the touch screen 6c. As will be described later, the setting screen (menu screen) in the present embodiment has two display modes MD1 and MD2. FIG. 2 shows a display screen GA in one of the display modes, namely, a map display mode MD1. FIG. 4 shows a display screen GB in the other display mode, namely, a group display mode MD2. As will be described later, these two display screens GA and GB are switched and displayed using switching buttons BW1 and BW2.

In the initial state of the display unit 6b (the touch screen 6c) of the image forming apparatus 1 (also referred to as the "initial state of the setting screen"), the display screen GA as shown in FIG. 2 is displayed on the touch screen 6c of the image forming apparatus 1. Examples of the initial state of the display unit 6b of the image forming apparatus 1 include an initial state immediately after power-on, an initial state immediately after the reset key has been pressed (immediately after resetting), and an initial state immediately after reversion from the sleep mode.

The display screen GA includes an icon display area RC and a function button display area RB (specifically, RB1). The icon display area RC and the function button display area RB1 are each an elongated area (strip-shaped area) extending in a horizontal direction. The icon display area RC is provided below the function button display area RB on the touch screen 6c. The function button display area RB1 is provided above the icon display area RC on the touch screen 6c. As will be described later, the content displayed in the function button display area RB can be changed according to an operation or the like performed on the icon display area RC.

In the icon display area RC, a plurality of icons CN corresponding to a plurality of function buttons BT for setting each function are horizontally arranged and displayed. In the icon display area RC, the icons CN displayed are classified into a plurality of function groups (also referred to simply as "groups") (specifically, collected in the function groups) according to their function.

The present embodiment describes a mode in which a plurality of (in this example, a total of 22) functions are classified into a plurality of (in this example, five) groups GP1 to GP5 (a "basic setting" group, an "original document" group, a "layout" group, an "application" group, and an "image quality/density" group) according to their attribute. Specifically, as shown in FIG. 3, the "basic setting" group GP1 includes five functions ("color", "density", "image quality of original document", "paper", and "zoom"). The "original document" group GP2 includes four functions ("original document settings", "book copy", "continuous reading", and "automatic image rotation"). The "layout" group GP3 includes six functions ("booklet", "binding edge", "image shift", "mirror image", "repeat", and "tiling"). The "application" group GP4 includes four functions ("OHP interleave", "cover insert", "sheet insert", and "chapter insert"), and the "image quality/density" group GP5 includes three functions ("background adjustment", "character contrast", and "glossy copy").

As a result of the classification described above, a total of 22 icons CN corresponding to 22 functions are classified (categorized) into the groups GP1 to GP5 according to their corresponding function attribute. Likewise, a total of 22 function buttons BT are also classified (categorized) into the groups GP1 to GP5 according to their corresponding function attribute. The groups GP1 to GP5 are also referred to as "groups for classifying function buttons (and icons)" or "groups into which the function buttons (and icons) are classified".

In the icon display area RC, the total of 22 icons CN corresponding to the aforementioned 22 functions are displayed such that they are arranged substantially linearly in the horizontal direction and are collected in the function groups. For example, five icons CN11 to CN15 on the left edge of the icon display area RC correspond respectively to the five functions of the basic settings group GP1 (i.e., "color", "density", "image quality of original document", "paper", and "zoom"). On the right side of the icons CN11 to CN15 are four icons CN21 to CN24 that correspond respectively to the four functions of the original document group GP2. Likewise, on the right side of the icons CN21 to CN24 are six icons CN31 to CN36 that correspond respectively to the six functions of the layout group GP3. On the right side of the CN31 to CN36 are four icons CN41 to CN44 that correspond respectively to the four functions of the application group GP4 and three icons CN51 to CN53 that correspond respectively to the three functions of the image quality/density group GP5, which are horizontally arranged in the order specified. In this way, the total of 22 icons CN are classified (categorized) into a plurality of groups according to the attribute of the function of the corresponding function button BT and are displayed in the icon display area RC.

The icon display area RC also includes a plurality of function name display areas GL1 to GL5. Each function name display area GLi is disposed in the vicinity (to be more specific, in the upper vicinity) of icons that correspond to the functions of the function name display area GLi among the plurality of icons CN arranged in the icon display area RC. That is, each function name display area GLi is disposed in the upper vicinity of the corresponding icons CN. For example, the function name display area GL1 is disposed in the vicinity of an icon group CN 1 (CN11 to CN15) corresponding to the group GP1, and the function name display area GL2 is disposed in the vicinity of an icon group CN2 (CN21 to CN24) corresponding to the group GP2. The other function name display areas GL3 to GL5 are also disposed in the same manner.

The icon display area RC is also provided with a slider SL for use in selecting some of the icons CN displayed in the icon display area RC. The slider SL has a range specification frame FR and a slider bar TH. The user can move the slider SL in the right-left direction (horizontal direction) by pressing and dragging the slider bar TH (drag operation). The range specification frame FR (range specification unit) of a predetermined width (e.g., a width in which eight to nine icons can be arranged) also moves along with the (horizontal) movement of the slider SL. By moving the range specification frame FR, the user can change (specify) a range to be displayed in the function button display area RB. To be specific, the function buttons BT corresponding to the icons within the range (specified range) enclosed with the moved range specification frame FR are newly specified as buttons to be displayed in the function button display area RB.

For example, in FIG. 2, the four icons CN21 to CN24 of the original document group GP2 and the five icons CN31 to CN35 on the left edge of the layout group GP3 are enclosed with the range specification frame FR. At this time, the function button display area RB displays the function buttons corresponding to the icons specified by the range specification frame FR. Specifically, the four function buttons BT21 to BT24 of the original document group GP2 and the five function buttons BT31 to BT35 of the layout group GP3 among all of the function buttons BT are displayed in the function button display area RB. Note that, in FIG. 2, the function button display area RB1 displays part of the function button BT35 because the range specification frame FR encloses not the entire but only part of the icon CN35 on the right edge of the range specification frame FR.

In this manner, some function buttons BT21 to BT24 and BT31 to BT35 among all of the function buttons BT are displayed in the function button display area RB1. To be more specific, first, the user specifies some icons CN21 to CN24 and CN31 to CN35 from among all of the icons displayed in the icon display area RC by moving the slider SL (specifically, the range specification frame FR) in the horizontal direction. This operation input, specifically, operation input to specify some of all of the icons horizontally arranged in the icon display area RC using the range specification frame FR (range specification input) is received by the input control unit 14. Then, the display control unit 12 displays the function buttons BT21 to BT24 and BT31 to BT35 corresponding to the icons specified by the range specification input in the function button display area RB1.

This operation involves scrolling the function buttons BT to be displayed in the function button display area RB by moving the range specification frame FR relative to the entire map represented by the string of icons in the icon display area RC. The operation is thus also referred to as a "map scroll operation". The icon display area RC (including the string of icons and the slider SL) is also referred to as a "map scroller" (MS), for example, because this area is for the map scroll operation.

As described above, the function buttons BT are selectively displayed in the function button display area RB1 in accordance with the map scroll operation performed on the icon display area RC (the scroll operation performed on the entire map represented by the string of icons).

Figure 5:
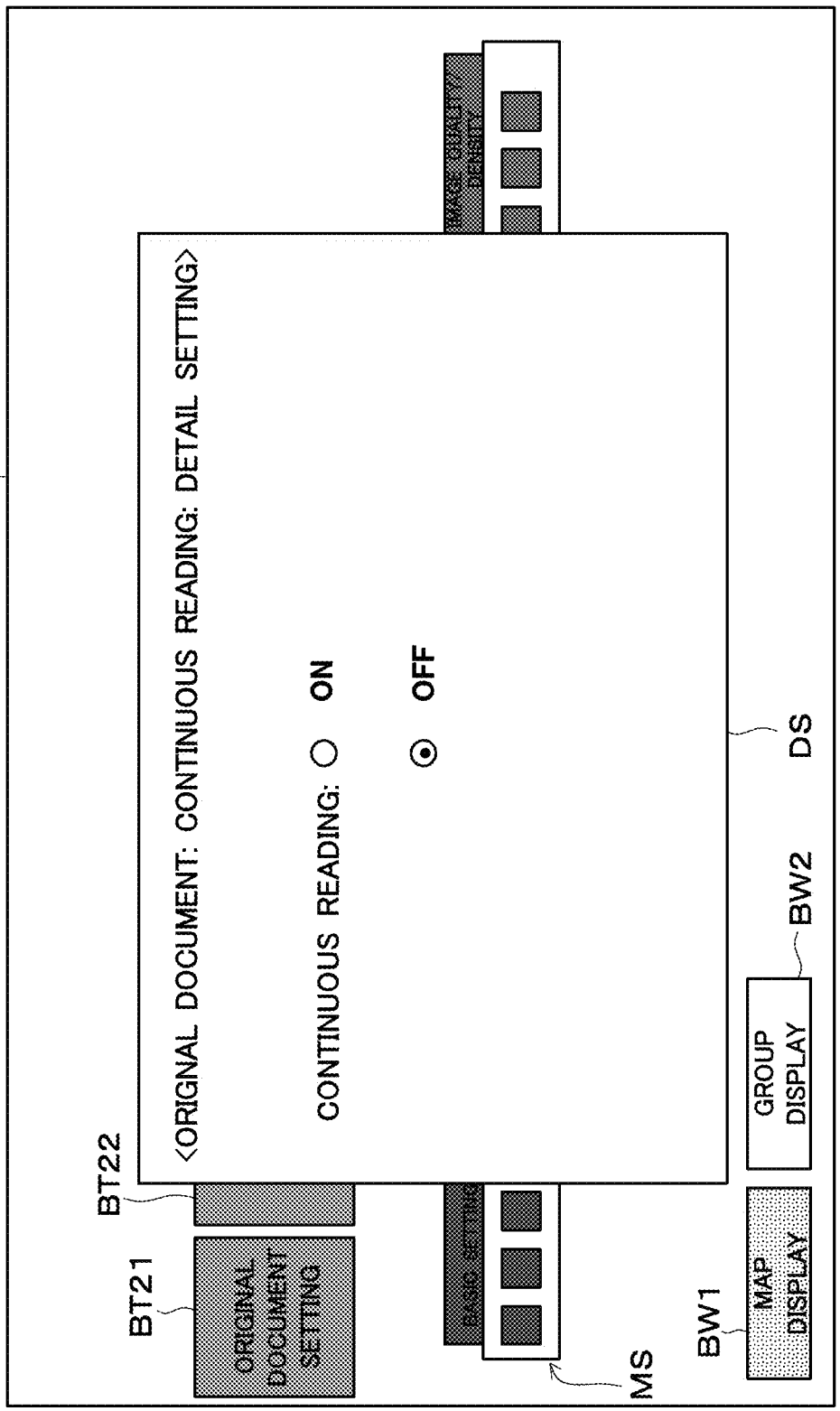
FIG. 5 shows a dialog screen superimposed on the display screen.

When one of the function buttons in the function button display area RB is pressed on the display screen GA shown in FIG. 2, the image forming apparatus 1 (the setting processing unit 11 and the display control unit 12) displays a dialog screen DS for setting the details of the pressed function button (see FIG. 5). FIG. 5 shows a display screen that appears immediately after the function button BT23 has been pressed. After the detail setting operation using the dialog screen DS is complete, the dialog screen DS is hidden and the display returns to the original display screen GA (FIG. 2).

The display screen GA shown in FIG. 2 includes the switching buttons BW1 and BW2 (a switching operation unit) for switching the display mode of the settings screen between the two display modes MD1 and MD2. The switching button BW1 is a button for switching to the map display mode MD1 (FIG. 2), and the switching button BW2 is a button for switching to the group display mode MD2 (FIG. 4).

FIG. 2 shows that the map display mode MD1 is currently being selected, with the switching button (also referred to as the "map display mode specification button") BW1 being highlighted (e.g., shaded or colored). When the other switching button (also referred to as the "group display mode specification button") BW2 is pressed in the display screen GA shown in FIG. 2, a switching operation to switch the mode from the map display mode MD1 to the group display mode MD2 is performed.

3. Display Screen GB

Next, the display screen GB in the other display mode MD2, specifically, the group display mode MD2 will be described with reference to FIG. 4.

As shown in FIG. 4, the display screen GB includes a group display instruction area RF and a function button display area RB (specifically, RB2). The group display instruction area RF and the function button display area RB2 are each an elongated area (strip-shaped area) extending in the horizontal direction. The group display instruction area RF is provided above the function button display area RB2 on the touch screen 6c. As will be described later, the content displayed in the function button display area RB2 is changed according to an operation or the like performed on the group display instruction area RF.

The group display instruction area RF is an area for receiving operation input to give an instruction to display function buttons BT belonging to one of the plurality of groups GP1 to GP5 in the function button display area RB (also referred to as "input of a group display instruction").

The group display instruction area RF is an elongated area (strip-shaped area) extending in the horizontal direction, and is provided above the function button display area RB2. The group display instruction area RF includes a plurality of buttons (also referred to as "group specification buttons") GT for specifying (selecting) a desired group from among the plurality of groups. In this example, five group specification buttons GT1 to GT5 are arranged in the group display instruction area RF. The group specification buttons GT1 to GT5 are buttons for specifying their corresponding groups GP1 to GP5 as groups to be displayed. In other words, each group specification button GT is used to input a group display instruction to display the function buttons belonging to the corresponding specific group in the function button display area RB2. For example, the group specification button GT2 is a button for providing an instruction to display the function buttons BT belonging to the corresponding specific group GP2 in the function button display area RB2.

Meanwhile, the function button display area RB2 is an area for displaying function buttons that belong to a specific group among all of the 22 function buttons. The function button display area RB2 displays only the function buttons BT (e.g., BT21 to BT24) that belong to a specific group (e.g., GP2) out of all of the function buttons BT (see FIG. 4).

To be more specific, when one of the five group specification buttons GT1 to GT5 (e.g., the group specification button GT2) is pressed, the group (function group) corresponding to the pressed group specification button GT is specified. Then, the function buttons belonging to the specified group are extracted, and the extracted function buttons are displayed in the function button display area RB2. In this way, in the group display mode MD2, (one or more) function buttons BT belonging to the specific group specified by the input of the group display instruction are displayed in the function button display area RB2 in response to one of the group specification buttons GT being pressed (input of a group display instruction).

For example, the display screen GB as shown in FIG. 4 is displayed on the touch screen 6c in response to the group specification button GT2 being pressed. To be more specific, when the group specification button GT2 has been pressed, the group (function group) GP2 corresponding to the group specification button GT2 is specified, and the function buttons BT21 to BT24 belonging to the group GP2 are extracted. The function buttons BT21 to BT24 belonging to the specific group GP2 are then displayed in the function button display area RB2. To be more specific, only the function buttons BT21 to BT24 are selectively displayed in the function button display area RB, and the other function buttons BT are not displayed (are hidden) in the function button display area RB. With this configuration, only the function buttons narrowed down by the "function" (the type of function) are displayed out of all of the function buttons, and it becomes easy for the user to find out the desired function button.

When one of the function buttons BT displayed in the function button display area RB2 is pressed, the image forming apparatus 1 (the setting processing unit 11 and the display control unit 12) displays a dialog screen DS for setting the details of the pressed function button (see, for example, FIG. 5). After the detail setting operation (user operation) using the dialog screen DS is complete, the display control unit 12 or the like causes the dialog screen DS to be hidden so that the display returns to the original screen (the display screen GB shown in FIG. 4).

As with the display screen GA shown in FIG. 2, the display screen GB shown in FIG. 4 also includes the switching buttons BW1 and BW2 (a switching operation unit) for switching the display mode of the setting screen between the two display modes MD1 and MD2.

FIG. 4 shows that the group display mode MD2 is currently being selected, with the switching button (group display mode specification button) BW2 being highlighted (e.g., shaded or colored). When the other switching button (map display mode specification button) BW1 is pressed in the display screen GB shown in FIG. 4, a switching operation to switch the mode from the group display mode MD2 to the map display mode MD1 is performed.

Note that the function buttons BT may be displayed in different colors determined for each function group or may be displayed in the same color on the display screens GA and GB. Likewise, the icons CN and the group specification buttons GT may be displayed in different colors determined for each function group, or may be displayed in the same color.

4. Transition Operation from Display Screens GA to GB

Next is a description of transition from the display screen GA to the display screen GB.

Figure 6:
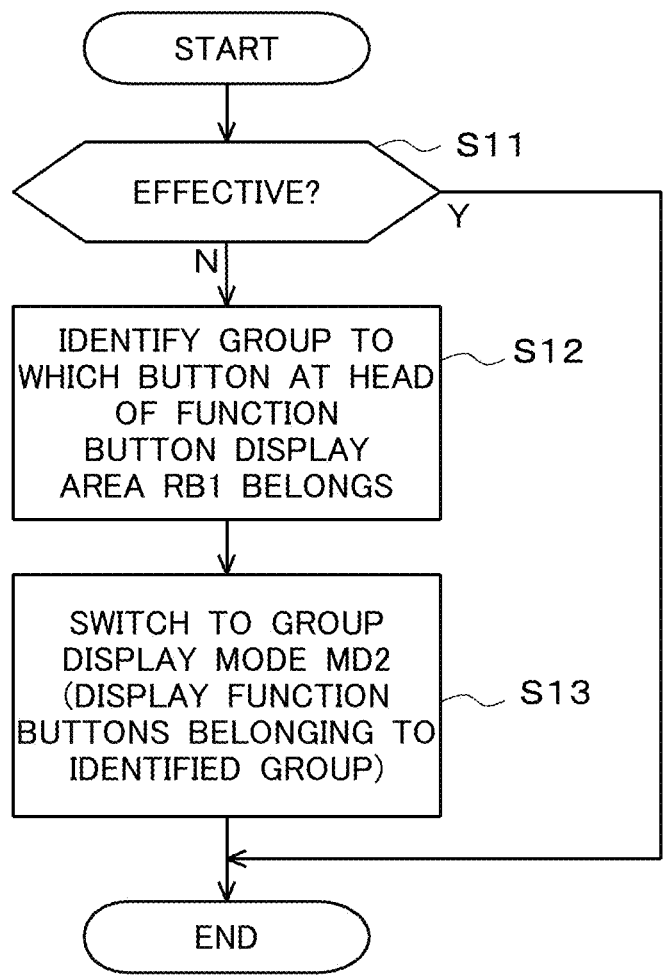
FIG. 6 is a flowchart of operations performed by the image forming apparatus when a group display mode specification button has been pressed.

For example, when the switching button (group display mode specification button) BW2 is pressed during display of the display screen GA shown in FIG. 2, an operation of transition from the map display mode MD1 to the group display mode MD2 is performed (see FIG. 6). That is, the transition operation is performed in accordance with input of an instruction to switch to the group display mode MD2. FIG. 6 is a flowchart of operations performed by the image forming apparatus 1 when the group display mode specification button BW2 is pressed. This operation is performed by the display control unit 12 or the like.

When the group display mode specification button BW2 has been pressed, first, the effectiveness of the pressing operation is checked in step S11. Specifically, when the group display mode specification button BW2 has been pressed after the transition to the group display mode MD2 (see FIG. 4), the pressing operation (mode switching operation) is determined to be ineffective, and no action is taken. On the other hand, when the group display mode specification button BW2 has been pressed in the map display mode MD1 (see FIG. 2), the pressing operation (mode switching operation (the operation of switching from the display screen GA to the display screen GB)) is determined to be effective, and the procedure proceeds from step S11 to step S12.

In step S12, in response to the mode switching operation, the display control unit 12 specifies one group to which the function button displayed at the head (on the left edge) of the function button display area RB1 (FIG. 2) belongs, as a group to be displayed. For example, in the function button display area RB1 shown in FIG. 2, the function button BT21 is displayed at the head (on the left edge) of the function button display area RB1. In this case, the display control unit 12 identifies the group GP2 to which the function button BT21 belongs as a group to be displayed.

Next, in step S13, an operation of transition to the group display mode MD2 is performed. At this time, the display control unit 12 displays the function buttons that belong to the identified group in the function button display area RB2. As a result, the display screen GB as shown in FIG. 4 is displayed, for example. To be specific, the four function buttons BT21 to BT24 belonging to the group GP2 (the group identified in step S12) are displayed in the function button display area RB2. To be more specific, only the function buttons BT21 to BT24 are selectively displayed in the function button display area RB2, and the other buttons BT are not displayed (are hidden) in the function button display area RB2.

The display control unit 12 further highlights the group specification button GT2 corresponding to the group GP2 to which the buttons BT21 to BT24 displayed in the function button display area RB2 belong, as shown in the display screen GB in FIG. 4. For example, the group specification button GT2 is enclosed with a bold frame for emphasis. This makes it easy for the user to recognize the function corresponding to the buttons displayed in the function button display area RB2.

In this way, in the display screen GB displayed after the mode transition, the function buttons BT21 to BT24 belonging to the specific group GP2 out of the function buttons BT are displayed in the function button display area RB2 (FIG. 4).

Then, when one of the function buttons in the function button display area RB of the display screen GB (FIG. 4) has been pressed, the image forming apparatus 1 (the setting processing unit 11 and the display control unit 12) displays a dialog screen DS for setting the details of the pressed function button (see FIG. 5). After the detail setting operation (user operation) using the dialog screen DS is complete, the display control unit 12 or the like causes the dialog screen DS to be hidden so that the display returns to the original screen (the display screen GB shown in FIG. 4).

Note that the buttons displayed in the function button display area RB2 of the display screen GB can be changed in response to another group specification button GT being pressed. For example, the buttons displayed in the function button display area RB2 can be changed to the six function buttons BT31 to BT36 belonging to the group GP3 (see FIG. 9) in accordance with the pressing of the group specification button GT3.

5. Transition Operation from Display Screens GB to GA

On the other hand, when the switching button (map display mode specification button) BW1 is pressed during display of the display screen GB as shown in FIG. 4, an operation of transition from the group display mode MD2 to the map display mode MD1 is performed. In other words, the transition operation is performed in accordance with input of an instruction to switch to the map display mode.

Next is a description of such a transition operation (the operation of transition from the display screen GB to the display screen GA).

Figure 7:
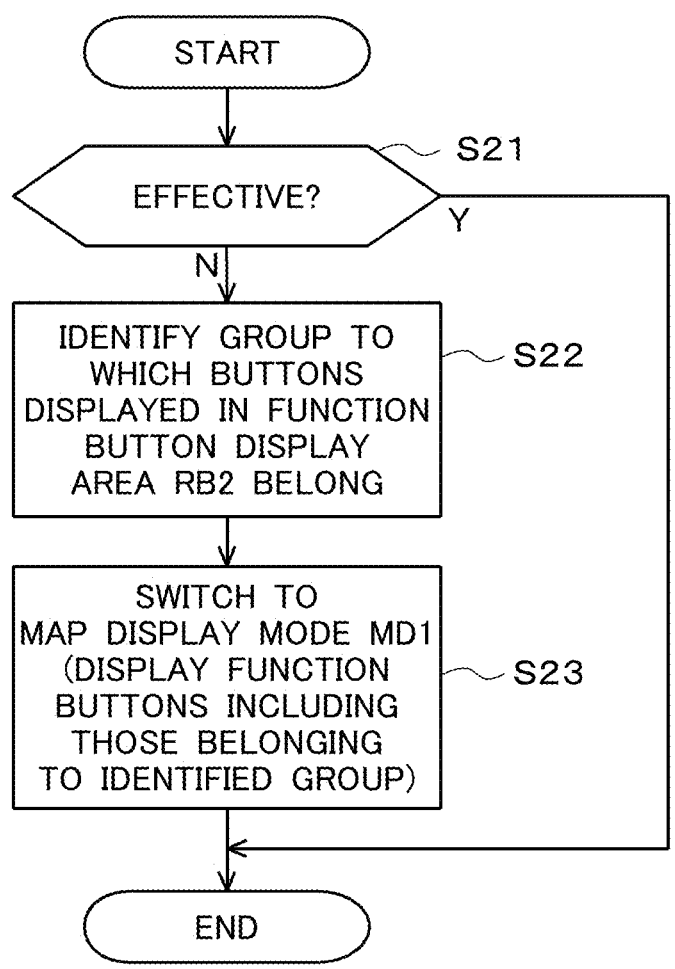
FIG. 7 is a flowchart of operations performed by the image forming apparatus when a map display mode specification button has been pressed.

When the switching button (map display mode specification button) BW1 is pressed during display of the display screen GB as shown in FIG. 4, an operation of transition from the group display mode MD2 to the map display mode MD1 is performed (see FIG. 7). FIG. 7 is a flowchart of operations performed by the image forming apparatus 1 when the map display mode specification button BW1 has been pressed. This operation is performed by the display control unit 12 or the like.

When the map display mode specification button BW1 has been pressed, first, the effectiveness of the pressing operation is checked in step S21. Specifically, when the map display mode specification button BW1 has been pressed after the transition to the map display mode MD1 (see FIG. 2), the pressing operation (mode switching operation) is determined to be ineffective, and no action is taken. On the other hand, when the map display mode specification button BW1 has been pressed in the group display mode MD2 (see FIG. 4), the pressing operation (mode switching operation (the operation to switch the mode from the display screen GB to the display screen GA)) is determined to be effective, and the procedure proceeds from step S21 to step S22.

In step S22, in response to the mode switching operation, the display control unit 12 identifies the group to which the function buttons displayed in the function button display area RB2 (FIG. 4) belong. For example, in the display screen GB shown in FIG. 4, the function buttons BT21 to BT24 are displayed in the function button display area RB2. Accordingly, the display control unit 12 identifies the group GP2 as a group to which the function buttons BT21 to BT24 belong.

Next, in step S23, an operation of transition to the map display mode MD1 is performed. At this time, the display control unit 12 displays a plurality of function buttons BT that includes the function buttons BT21 to BT24 belonging to the identified group GP2 in the function button display area RB1. To be specific, the function buttons BT21 to BT24 (of the group GP2) displayed in the function button display area RB2 are arranged in the order from the head position of the function button display area RB1 and displayed in the head portion (in the horizontal direction) of the function button display area RB1. As a result, the display screen GA as shown in FIG. 2 is displayed, for example. To be more specific, the four function buttons BT21 to BT24 belonging to the group GP2 (the group identified in step S12) and the five function buttons BT31 to BT35 on the left side out of the six function buttons BT belonging to the group GP3, which is next to the group GP2 in the order, are displayed in the function button display area RB1. In other words, a predetermined number of function buttons BT starting from the function button BT21 are displayed in the function button display area RB1.

With this configuration, the function buttons BT21 to BT24 that were displayed in the display screen GB before the mode transition are continuously displayed in the display screen GA after the mode transition. Thus, the user can perform an operation of selecting a function with the feeling of continuity in operation being maintained.

Also, when one of the function buttons BT in the function button display area RB1 of the display screen GA (FIG. 2) has been pressed, the image forming apparatus 1 (the setting processing unit 11 and the display control unit 12) displays the dialog screen DS for setting the details of the pressed function button BT (see FIG. 5). After the detail setting operation (user operation) using the dialog screen DS is complete, the display control unit 12 or the like causes the dialog screen DS to be hidden so that the display returns to the original screen (the display screen GB shown in FIG. 2).

In the display screen GA, the buttons to be displayed in the function button display area RB1 can be changed through an operation of moving the slider SL. For example, when the slider SL is slid further to the left to move the range specification frame FR toward the left, icons that are relatively on the left side are displayed in the function button display area RB1. For example, when icons CN14, CN15, CN21 to CN24, CN31, and CN32 are within the moved range specification frame FR in the icon display area RC, the function buttons BT14, BT15, BT21 to BT24, BT31, and BT32 corresponding to these icons are displayed in the function button display area RB1 (see FIG. 11).

6. Advantageous Effects of Embodiments

According to the operations described above, the display mode of the settings screen transitions between the map display mode MD1 and the group display mode MD2 in response to the pressing of the switching button BW1 or BW2. The user can thus easily use either of the two display modes depending on the purpose. For example, the user can use the map display mode MD1 when needing to get an overview of the function buttons, and can use the group display mode MD2 when having known in advance a function group to which the function to be set belongs. In the latter case, in particular, the user can directly display the functions of a specific group without operating the slider and thus can set functions through a relatively simple operation. In this way, the user can switch between and use the display screen GA that provides an excellent overview of the function buttons and the display screen GB that provides excellent function selection by the function group, with a simple operation. Accordingly, the user can attain a high level of operability.

In particular, the switching buttons BW1 and BW2 (specifically, the switching button BW2) provided in the display screen GA facilitates the operation of screen transition from the settings screen GA to the display screen GB. Likewise, the switching buttons BW1 and BW2 (specifically, the switching button BW1) provided in the display screen GB facilitates the operation of screen transition from the settings screen GB to the display screen GA. As described above, the provision of the switching buttons BW1 and BW2 in the display screens GA and GB facilitates the operation of screen transition between the settings screen GA and the display screen GB.

In particular, a plurality of icons CN (FIG. 2) are horizontally arranged in the display screen GA, and a plurality of group specification buttons GT (FIG. 4) are also horizontally arranged in the display screen GB. In addition to this, the function buttons BT to be displayed are arranged and displayed in the same direction (horizontal direction) in both of the function button display areas RB1 and RB2. To be more specific, in the display screen GA (FIG. 2), some function buttons BT are horizontally arranged and displayed in the function button display area RB1 in response to a specification operation performed on a plurality of horizontally arranged icons CN. In the display screen GB (FIG. 4), the function buttons BT belonging to a specific group are displayed in the function button display area RB2 in response to a selection operation performed on a plurality of horizontally arranged group specification buttons GT. As described above, the display screen GA and the display screen GB have commonality in the operational direction as well as in the display direction, and therefore the user can get the feeling of continuity in operation (the feeling of unified operations) before and after switching of the display screen.

Also, a plurality of icons CN, in particular, are classified into groups and displayed in the icon display area RC of the display screen GA, and some function buttons displayed in the function button display area RB1 of the display screen GA are also classified into groups and displayed. Also, the group display instruction area RF of display screen GB displays a plurality of group specification buttons GT as the buttons for specifying each group, and the function button display area RB2 of the display screen GB displays the function buttons belonging to a specific group collectively (on a group-by-group basis). Accordingly, in both of the display screens GA and GB, the function buttons BT are classified into groups and displayed in the function button display area RB (RB1, RB2), and therefore the user can get the feeling of unified operations before and after switching of the display screen.

Furthermore, a plurality of icons CN classified into a plurality of groups GP in the icon display area RC of the display screen GA are horizontally displayed in a predetermined order of groups (the order of the groups GP1, GP2, GP3, GP4, and GP5), and a plurality of group specification buttons GT in the display screen GB are also displayed in the predetermined order of groups in the same direction (horizontal direction). Therefore, in this respect as well, the user can get the feeling of unified operations before and after switching of the display screen.

7. Variations

While the above has been a description of embodiments of the present invention, the present invention is not intended to be limited to the content described above.

7-1. Arrangement Direction of Group Specification Buttons GT in Display Screen GB Although the above embodiment describes, for example, a mode in which the group specification buttons GT1 to GT5 are arranged in the right-left direction (lateral direction) in the display screen GB (see FIG. 4), the present invention is not limited thereto.

Figure 8:
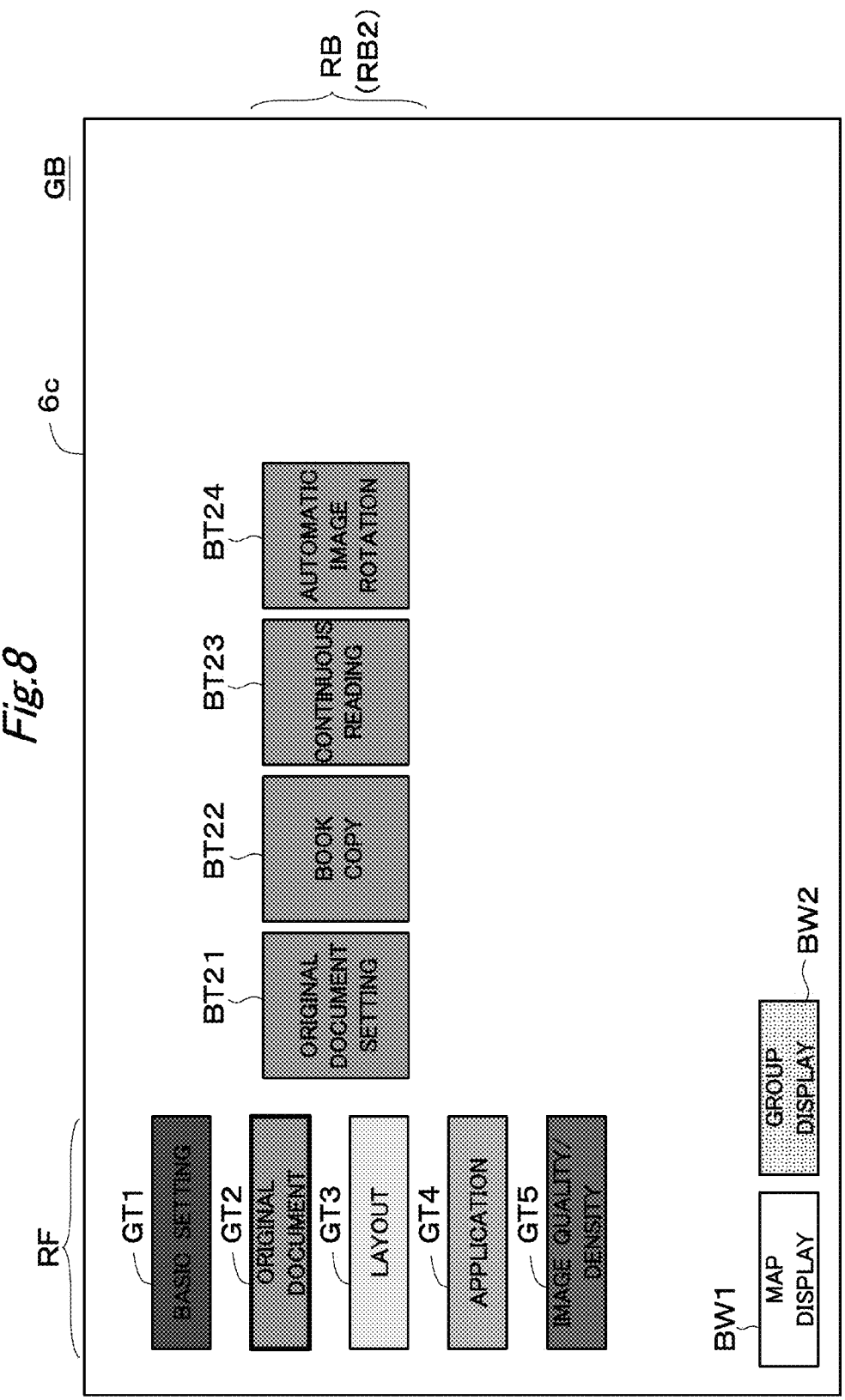
FIG. 8 shows a display screen in the group display mode.

Specifically, the screen may be switched (from the display screen GA shown in FIG. 2) to a display screen GB shown in FIG. 8. In the display screen GB shown in FIG. 8, the group display instruction area RF is formed as a strip-shaped area extending in the up-down direction (vertical direction), and the group specification buttons GT1 to GT5 are arranged in the up-down direction (vertical direction). Such a display screen GB may be displayed after switching of the display screen. However, when emphasis is provided on the feeling of continuity in operation before and after the screen switching, it is preferable that the screen is switched from the display screen GA shown in FIG. 2 to the display screen GB shown in FIG. 4 as in the above-described embodiment. Note that in the case where buttons are displayed in the up-down direction, the upper end side may be taken as the head side.

7-2. Switching from Display Screens GA to GB

Although the above embodiment describes a mode (FIG. 4) in which in response to the operation of switching from the display screen GA to the display screen GB, one group GP2 to which the function button BT21 displayed at the head of the function button display area RB1 (FIG. 2) belongs is identified, and the function buttons BT21 to BT24 belonging to the group GP2 are displayed in the function button display area RB2, the present invention is not limited thereto.

Figure 9:
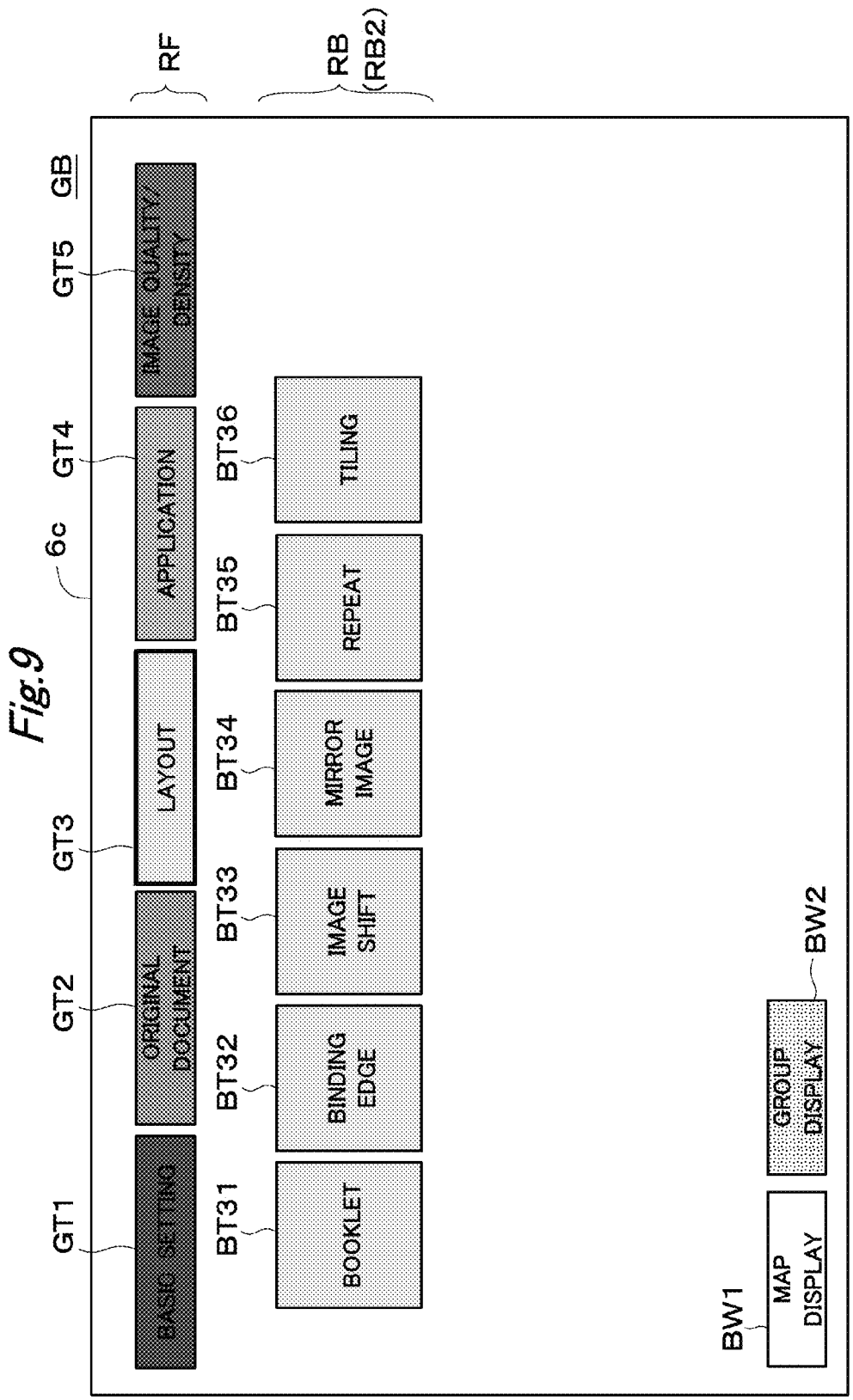
FIG. 9 shows a display screen in the group display mode.

For example, a configuration is possible in which in response to a switching operation from the display screen GA to the display screen GB, one group that displays a largest number of function buttons BT in the function button display area RB1 is identified from among the plurality of groups GP1 to GP5, and the function buttons BT belonging to the identified group are displayed in the function button display area RB2. Specifically, the group GP3 may be identified, to which the large number of function buttons BT31 to BT35 among the function buttons BT21 to BT24, and BT31 to BT35 (FIG. 2) displayed in the function button display area RB1 belong. As shown in FIG. 2, the function button display area RB1 displays the four function buttons BT21 to BT24 belonging to the group GP2 and the five function buttons BT31 to BT35 belonging to the group GP3. In this case, the group GP3 whose number of function buttons BT being displayed (five) is relatively greater than that of the other group is selected. As shown in FIG. 9, all of the six function buttons BT31 to BT36 belonging to the identified group GP3 may be displayed in the function button display area RB2. FIG. 9 shows a display screen GB according to this variation.

Figure 10:
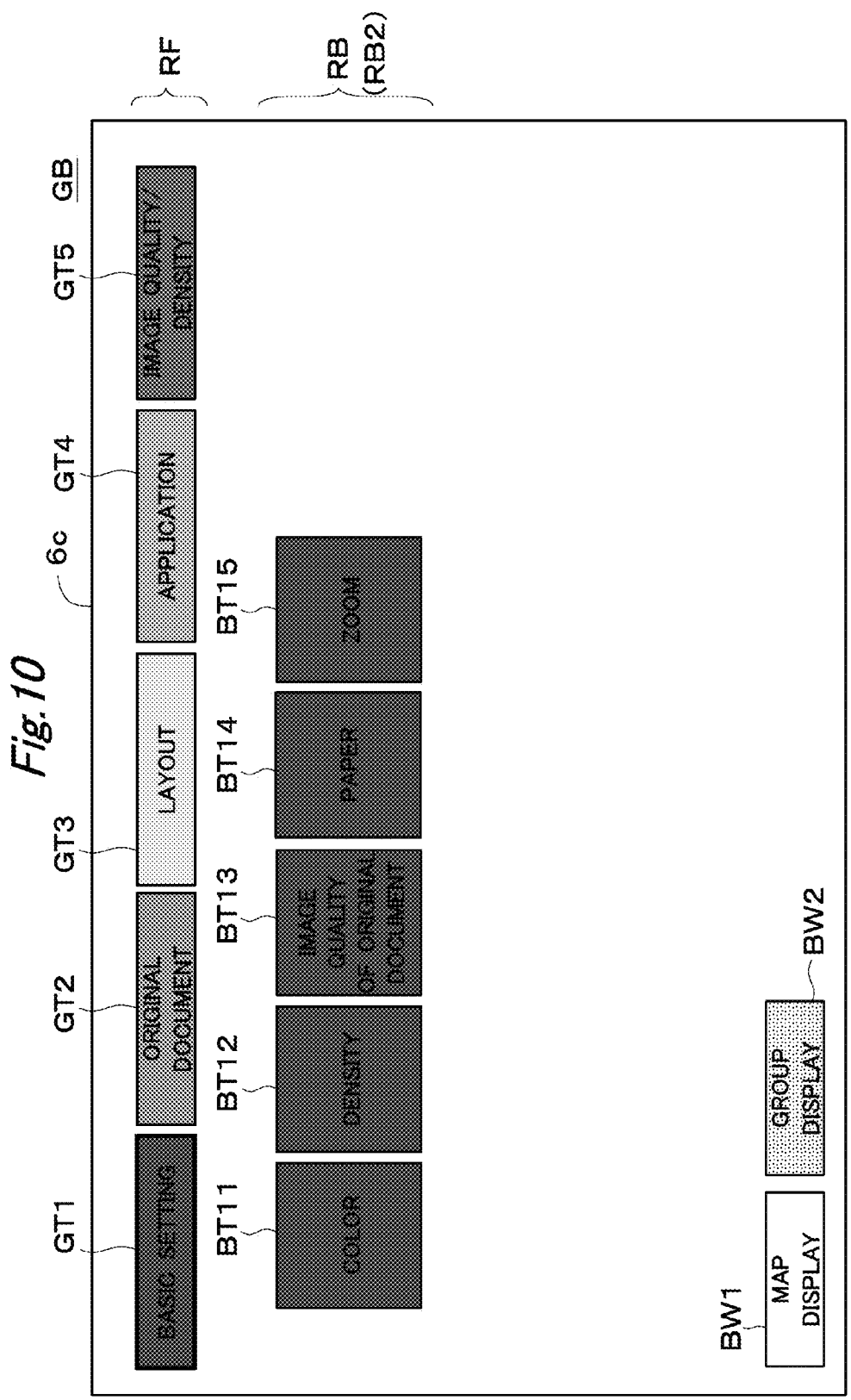
FIG. 10 shows a display screen in the group display mode.

Alternatively, a configuration is also possible in which in response to a switching operation from the display screen GA to the display screen GB, all of the five function buttons BT11 to BT15 belonging to the first group GP1 are constantly displayed in the function button display area RB2 (see FIG. 10). Here, the group GP1 can also be referred to as a group to which the first icon CN11 among a plurality of icons CN (string of icons) displayed in the function button display area RB1 belongs. In this way, the first group GP1 may be constantly displayed in the function button display area RB2 of the display screen GB after switching.

7-3. Switching from Display Screens GB to GA

The above embodiment describes a mode (FIG. 2) in which in response to a switching operation from the display screen GB to the display screen GA, the function buttons BT21 to BT24 that have been displayed in the function button display area RB2 (FIG. 4) are arranged in order from the head position (in the horizontal direction) of the function button display area RB1 and displayed in the function button display area RB1. The present invention is, however, not limited thereto.

Figure 11:
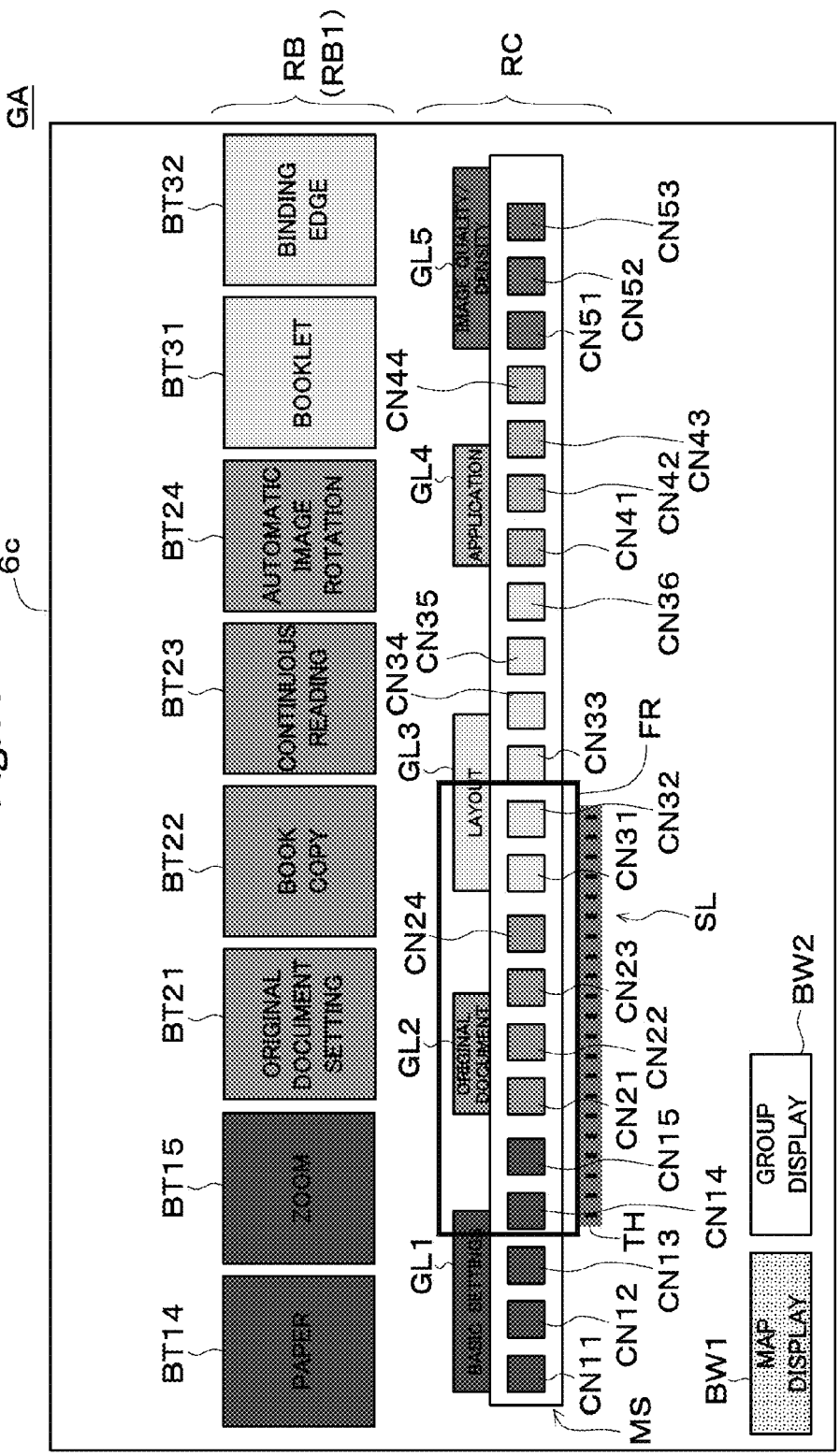
FIG. 11 shows a display screen in the map display mode.

For example, a configuration is possible in which in response to a switching operation from the display screen GB to the display screen GA, the function buttons BT21 to BT24 that have been displayed in the function button display area RB2 (FIG. 4) are displayed in the center portion in the horizontal direction of the function button display area RB1 (see FIG. 11). In FIG. 11, the function buttons BT21 to BT24 of the group GP2 are disposed in the center portion of the function button display area RB1, and the two function buttons BT14 and BT15 of the group GP1 are disposed on the left side of the function buttons BT21 to BT24. On the right side of the function buttons BT21 to BT24 are disposed the two function buttons BT31 and BT32 of the group GP3. Here, the function buttons BT14 and BT15 correspond respectively to the icons CN14 and CN15 disposed on the left of the string of the icons CN21 to CN24 in the icon display area RC. Likewise, the function buttons BT31 and BT32 correspond respectively to the icons CN31 and CN32 disposed on the right of the string of the icons CN21 to CN24 in the icon display area RC.

7-4. Specification of Initial Display Screen

The above embodiment describes a mode in which the display screen GA is always displayed first on the touch screen 6c in the initial state of the display unit 6b (the touch screen 6c) of the image forming apparatus 1 (the initial state of the settings screen). The present invention is, however, not limited thereto.

Conversely, the display screen GB may be always displayed first on the touch screen 6c in the initial state.

Alternatively, the type of the display screen displayed in the initial state (in other words, the display mode in the initial state) may be changed by user's settings. Specifically, the user may perform a setting operation, using a detail setting screen GX (GX1) as shown in FIG. 12.

Figure 12:
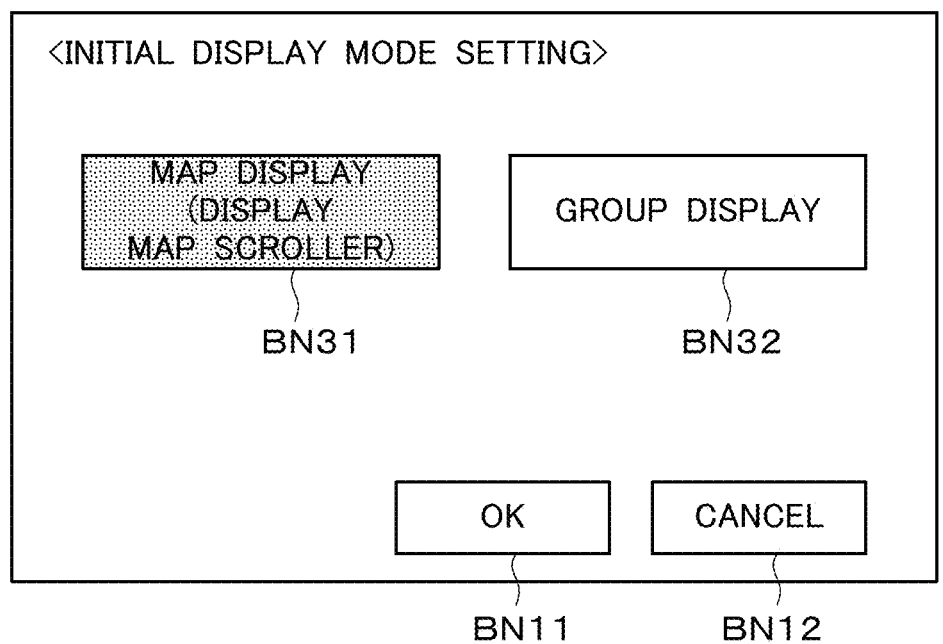
FIG. 12 shows a detail setting screen for setting an initial display mode.

The detail setting screen GX shown in FIG. 12 is a screen for specifying either of the display screen GA and the display screen GB as an initial menu screen to be displayed on the touch screen 6c in the initial state. The detail setting screen GX is displayed on the touch screen 6c by, for example, operating a given hardware key provided in the operation panel unit 6p. The user can select the desired one from the two options (a "map display mode" button BN31 and a "group display mode" button BN32) displayed on the detail setting screen GX and then confirm the selection by pressing an OK button BN11. In this way, the display mode in the initial state is specified by the user. When a cancel button BN12 is pressed, the selected option is not confirmed and canceled.

In the initial state after the setting processing using the detail setting screen GX, the image forming apparatus 1 (the display control unit 12) displays the display screen (GA or GB) corresponding to the display mode specified by the user using the detail setting screen GX on the touch screen 6c. For example, when the "map display mode" button BN31 has been selected in FIG. 12, the image forming apparatus 1 first displays the display screen GA in the display mode MD1 on the touch screen 6c in an initial state afterward (e.g., an initial state after restart). When the "group display mode" button BN32 has been selected in FIG. 12, the image forming apparatus 1 first displays the display screen GB in the display mode MD2 on the touch screen 6c in an initial state afterward (e.g., an initial state after restart).

Such specification may be performed for each apparatus or for each user.

When the specification as described above is performed for each user, the user may make their own settings when logged into the image forming apparatus 1. Specifically, as described above, the image forming apparatus 1 may receive a specification operation by a specific user, using the detail setting screen GX1 as shown in FIG. 12. Then, in an initial state afterward (e.g., immediately after the specific user has again logged into the image forming apparatus 1), the image forming apparatus 1 may first display the display screen specified by the specific user through the specification operation (e.g., the display screen GA in the display mode MD1) on the touch screen 6c. In this way, when the image forming apparatus 1 is used by a specific user after a specification operation by the specific user, a display screen specified by the specific user may be displayed on the display unit 6b in the initial state.

Figure 13:
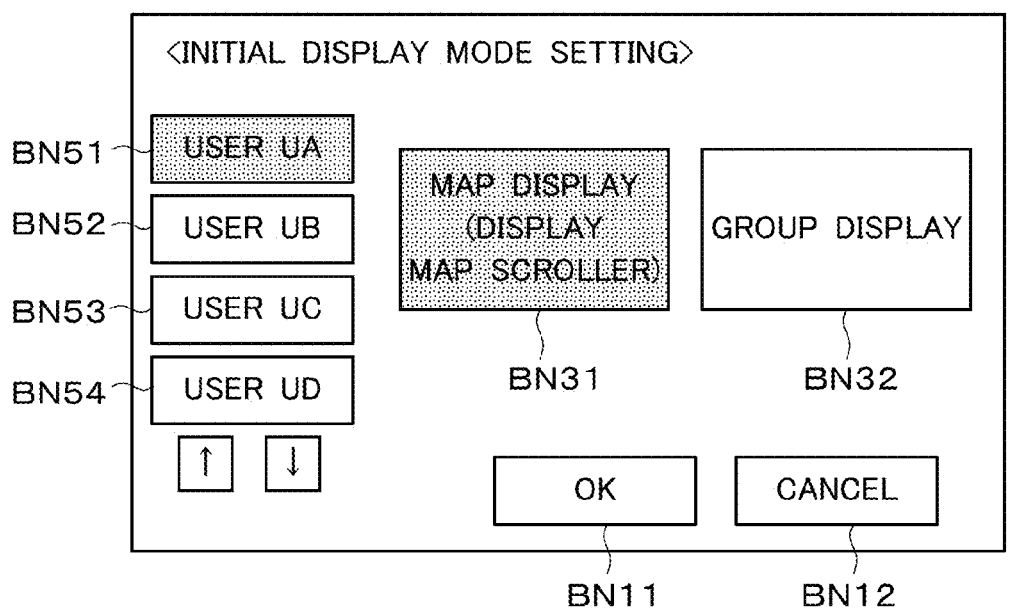
FIG. 13 shows a detail setting screen (for the administrator) for setting an initial display mode.

Alternatively, in the case where the specification as described above is performed for each user, the administrator may collectively make settings for each user. FIG. 13 shows a detail setting screen GX (GX2) for the administrator used in such a case. The detail setting screen GX2 shown in FIG. 13 includes buttons BN31, BN32, BN11, and BN12, as with the detail setting screen GX1 shown in FIG. 12. The detail setting screen GX2 further includes user specification buttons BN51 to BN54 for specifying a user for which settings are made from among a plurality of users.

The detail setting screen GX2 is a screen for use by the administrator (a screen displayed in the administrator mode) and for receiving specification (specification from the administrator) as to which of the display screens GA and GB is to be displayed on the display unit 6b for each user. The administrator first selects a button corresponding to the desired user from among the specification buttons BN51 to BN54. For example, in the case where the administrator wants to make settings for a user UA, it is sufficient that the user specification button BN51 corresponding to the user UA be pressed. Then, a setting operation is performed for the selected user, using, for example, the buttons BN31 and BN32 in the same manner as in FIG. 12. The same operation can also be performed for the other users UB, UC, and so on.

In the initial state afterward, e.g., in the initial state immediately after the user UB has again logged into the image forming apparatus 1, it is sufficient for the image forming apparatus 1 to first display a display screen specified by the operation of the administrator for the user UB (e.g., the display screen GB in the display mode MD2) on the touch screen 6c. In the initial state immediately after another user UC has again logged into the image forming apparatus 1, it is sufficient for the image forming apparatus 1 to first display a display screen specified by the operation of the administrator for the user UC (e.g., the display screen GA in the display mode MD1) on the touch screen 6c.

In this way, a configuration is possible in which when a user logs into and use the image forming apparatus 1 after the administrator has performed a specification operation for each user, either one of the display screens GA and GB specified for the user (logged-in user) is displayed on the display unit 6b in the initial state.

Alternatively, instead of the specification operations described above, the display mode (display screen) in the initial state may be determined according to the actual number of times a switching operation is performed by a user. With this configuration, a display mode favored by the user (a display mode the user wants to use) can be automatically determined.

Specifically, the image forming apparatus 1 (specifically, a count unit 15 (not shown) in the controller 9) counts the number of times the mode is switched using the switching button BW1 and the number of times the mode is switched using the switching button BW2, and stores the counting results in the storage unit 5. FIG. 14 shows a data table TB in which the numbers of times the mode is switched (the counting results) are stored. The data table TB stores information indicating that the number of times N1 the mode is switched to the map display mode MD1 (the display screen GA) using the switching button BW1 is 183, and the number of times N2 the mode is switched to the group display mode MD2 (the display screen GB) using the switching button BW2 is 201.

In order to better reflect user's preferences, in the case where the switching buttons BW1 and BW2 are successively pressed at a time interval within a predetermined period (e.g., 10 seconds), it is preferable that only the last press of a switching button is counted as the number of times the mode is switched. For example, it is preferable that when the switching button BW1 is pressed once and then the switching button BW2 is pressed three seconds after the press of the switching button BW1, only the press of the switching button BW2 is counted as the number of times the mode is switched (only the number of times N2 is counted up) without counting the press of the switching button BW1.

Then, the image forming apparatus 1 (the display control unit 12) may determine a display screen to be displayed in the initial state, on the basis of the counting results. Specifically, when the number of times N1 the mode is switched to the map display mode MD1 (the display screen GA) is greater than the number of times N2 the mode is switched to the group display mode MD2 (the display screen GB) is performed, the display screen GA corresponding to the map display mode MD1 may be displayed on the display unit 6b in the initial state. On the other hand, when the number of times N2 is greater than the number of times N1 as shown in FIG. 14, the display screen GB in the group display mode MD2 may be displayed on the display unit 6b in the initial state.

These numbers of times the mode is switched may be counted for each apparatus or for each user, and the initial display mode may be determined on the basis of the numbers of times counted for each apparatus or the numbers of times counted for each user.

7-5. Switching Operation

Although the above embodiment describes a mode in which the buttons (software buttons) BW1 and BW2 displayed on the touch screen 6c are provided as a switching operation unit, the present invention is not limited thereto.

For example, icons displayed on the touch screen 6c may be provided as a switching operation unit for receiving input of a switching instruction from an operator.

Alternatively, a dedicated hardware operation member (e.g., hardware buttons BW1 and BW2) provided separately from the touch screen 6c (provided, for example, in the vicinity outside the touch screen 6c) may be used as the switching operation unit. Then, the hardware buttons BW1 and BW2 may be used for switching between the two display modes MD1 and MD2.

The switching operation unit does not require provision of the two buttons BW1 and BW2. For example, a configuration is possible in which only one switching button is provided and used to perform switching from the currently selected mode to another mode. To be more specific, the two display modes MD1 and MD2 may be alternately selected every time the single switching button is pressed.

7-6. Other Embodiments

Although the above embodiment describes an MFP (Multi-Functional Peripheral) serving as the image forming apparatus 1, the present invention is not limited thereto. For example, the image forming apparatus 1 may be configured as various types of single-function apparatuses (e.g., a copy apparatus, a printing apparatus, or a scanner apparatus).

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming apparatus comprising:
   a display control unit configured to display a setting screen on a display unit; and
   a switching operation unit configured to switch a display mode of the setting screen between a first display mode and a second display mode,
   wherein a first display screen displayed in the first display mode includes an icon display area and a first function button display area, the icon display area displaying a plurality of icons that are arranged in a predetermined direction and the first function button display area displaying a plurality of function buttons for setting each function, each of the icons corresponds to a respective one of the plurality of function buttons, and the first function button display area displaying, among the plurality of function buttons, some function buttons that correspond to some icons specified from among the plurality of icons by a range specification unit,
   the plurality of function buttons are classified into a plurality of groups according to their function attribute, and
   a second display screen displayed in the second display mode includes a group display instruction area and a second function button display area, the group display instruction area being provided with a plurality of group specification buttons for receiving input of a group display instruction to display function buttons that belong to a specific group among the plurality of groups, and the second function button display area displaying the function buttons belonging to the specific group among the plurality of function buttons.

2. The image forming apparatus according to claim 1, wherein
   the plurality of group specification buttons in the second display screen are also arranged in the predetermined direction, and
   the display control unit displays function buttons to be displayed, the function buttons being arranged in the predetermined direction, in both of the first function button display area and the second function button display area.

3. The image forming apparatus according to claim 2, wherein
   in the first function button display area of the first display screen, the some function buttons are displayed classified into groups, and
   in the second function button display area of the second display screen, the function buttons belonging to the specific group are displayed.

4. The image forming apparatus according to claim 3, wherein
   in the icon display area of the first display screen, the plurality of icons are displayed classified into a plurality of groups, and
   in the group display instruction area of the second display screen, the plurality of group specification buttons are displayed as buttons for specifying each group.

5. The image forming apparatus according to claim 4, wherein
   the plurality of icons classified into the plurality of groups are displayed in a predetermined order of groups in the predetermined direction in the icon display area of the first display screen, and
   the plurality of group specification buttons in the second display screen are also displayed in the predetermined order of groups in the predetermined direction.

6. The image forming apparatus according to claim 1, wherein
   the display control unit is configured to, in response to a switching operation from the first display mode to the second display mode performed by the switching operation unit, identify a group to which a function button displayed at the head of the first function button display area belongs, and display function buttons belonging to the group that has been identified, in the second function button display area.

7. The image forming apparatus according to claim 1, wherein
   the display control unit is configured to, in response to a switching operation from the first display mode to the second display mode performed by the switching operation unit, identify a group to which a largest number of function buttons belong among the some function buttons displayed in the first function button display area, and display function buttons belonging to the group that has been identified, in the second function button display area.

8. The image forming apparatus according to claim 1, wherein
   the display control unit is configured to, in response to a switching operation from the first display mode to the second display mode performed by the switching operation unit, display function buttons that belong to the same group as a group to which an icon at the head of the plurality of icons belongs, in the second function button display area.

9. The image forming apparatus according to claim 1, wherein
the display control unit is configured to, in response to a switching operation from the second display mode to the first display mode performed by the switching operation unit, display function buttons that include the function buttons displayed in the second function button display area, in the first function button display area.

10. The image forming apparatus according to claim 1, wherein
the display control unit is configured to, in response to a switching operation from the second display mode to the first display mode performed by the switching operation unit, display the function buttons displayed in the second function button display area, in a center portion in the predetermined direction of the first function button display area.

11. The image forming apparatus according to claim 1, wherein
the display control unit is configured to, in response to a switching operation from the second display mode to the first display mode performed by the switching operation unit, display the function buttons displayed in the second function button display area, in a head portion in the predetermined direction of the first function button display area.

12. The image forming apparatus according to claim 1, further comprising:
a specification unit configured to specify which of the first display screen and the second display screen is to be displayed on the display unit in an initial state of the setting screen,
wherein the display control unit is configured to display the display screen specified by the specification unit on the display unit in the initial state.

13. The image forming apparatus according to claim 12, wherein
the specification unit is configured to receive specification from a specific user as to which of the first display screen and the second display screen is to be displayed on the display unit, and
the display control unit is configured to display the display screen specified by the specific user on the display unit in the initial state when the image forming apparatus is used by the specific user.

14. The image forming apparatus according to claim 12, wherein
the specification unit is configured to receive specification from an administrator as to which of the first display screen and the second display screen is to be displayed on the display unit for each user, and
the display control unit is configured to display either of the first display screen and the second display screen that is specified for each user on the display unit in the initial state when the image forming apparatus is used by the user.

15. The image forming apparatus according to claim 1, further comprising:
a count unit configured to count a first number of times the display mode is switched from the second display mode to the first display mode and a second number of times the display mode is switched from the first display mode to the second display mode,
wherein the display control unit is configured to, when the first number of times is greater than the second number of times, display the first display screen on the display unit in the initial state, and when the second number of times is greater than the first number of times, display the second display screen on the display unit in the initial state.

16. A non-transitory computer-readable recording medium recording a program for causing a computer to execute:
a) displaying a first display screen on a display unit, the first display screen including an icon display area and a first function button display area, the icon display area displaying a plurality of icons that are arranged in a predetermined direction and the first function button display area displaying a plurality of function buttons for setting each function, each of the icons corresponds to a respective one of the plurality of function buttons, and the first function button display area displaying, among the plurality of function buttons, some function buttons that correspond to some icons specified from among the plurality of icons by a range specification unit;
b) displaying a second display screen on the display unit, the second display screen including a group display instruction area and a second function button display area, the group display instruction area being provided with a plurality of group specification buttons for receiving input of a group display instruction to display function buttons that belong to a specific group among a plurality of groups into which the plurality of function buttons are classified, and the second function button display area displaying the function buttons belonging to the specific group among the plurality of function buttons;
c) receiving a switching instruction to cause a switching operation unit to switch between the first display screen and the second display screen; and
d) performing a switching operation to switch to the first display screen or a switching operation to switch to the second display screen in accordance with the switching instruction.

17. A method for controlling an image forming apparatus, comprising:
a) displaying a first display screen on a display unit, the first display screen including an icon display area and a first function button display area, the icon display area displaying a plurality of icons that are arranged in a predetermined direction and the first function button display area displaying a plurality of function buttons for setting each function, each of the icons corresponds to a respective one of the plurality of function buttons, and the first function button display area displaying, among the plurality of function buttons, some function buttons that correspond to some icons specified from among the plurality of icons by a range specification unit;
b) displaying a second display screen on the display unit, the second display screen including a group display instruction area and a second function button display area, the group display instruction area being provided with a plurality of group specification buttons for receiving input of a group display instruction to display function buttons that belong to a specific group from among a plurality of groups into which the plurality of function buttons are classified, and the second function button display area displaying the function buttons belonging to the specific group among the plurality of function buttons;
c) receiving a switching instruction to cause a switching operation unit to switch between the first display screen and the second display screen; and d) performing a switching operation to switch to the first display screen or a switching operation to switch to the second display screen in accordance with the switching instruction.

\* \* \* \* \*